US011349868B2

(12) United States Patent
Naccarato et al.

(10) Patent No.: US 11,349,868 B2
(45) Date of Patent: May 31, 2022

(54) DETECTION OF SPOOFED INTERNALLY-ADDRESSED EMAIL USING TRUSTED THIRD PARTY'S SPF RECORDS

(71) Applicant: Forcepoint, LLC, Austin, TX (US)

(72) Inventors: Tony G. Naccarato, Surrey (GB); James R. Gordon, Berkshire (GB)

(73) Assignee: Forcepoint, LLC, Austin, TX (US)

( * ) Notice: Subject to any disclaimer, the term of this patent is extended or adjusted under 35 U.S.C. 154(b) by 175 days.

(21) Appl. No.: 15/874,283

(22) Filed: Jan. 18, 2018

(65) Prior Publication Data

US 2019/0222608 A1   Jul. 18, 2019

(51) Int. Cl.
*H04L 51/00* (2022.01)
*H04L 9/40* (2022.01)
*H04L 51/48* (2022.01)

(52) U.S. Cl.
CPC .......... *H04L 63/1483* (2013.01); *H04L 51/12* (2013.01); *H04L 63/1425* (2013.01); *H04L 63/1466* (2013.01); *H04L 51/28* (2013.01)

(58) Field of Classification Search
CPC ..... H04L 51/12; H04L 51/28; H04L 63/1425; H04L 63/1483; H04L 63/1466
See application file for complete search history.

(56) References Cited

U.S. PATENT DOCUMENTS

| 7,249,369 | B2 | 7/2007 | Knouse et al. |
| 8,060,904 | B1 | 11/2011 | Evans et al. |
| 8,073,912 | B2 * | 12/2011 | Kaplan ............... H04L 63/0245 709/206 |
| 8,347,392 | B2 | 1/2013 | Chess et al. |
| 8,856,869 | B1 | 10/2014 | Brinskelle |
| 9,465,668 | B1 | 10/2016 | Roskind et al. |
| 9,686,308 | B1 * | 6/2017 | Srivastava ........... G06Q 10/107 |
| 9,826,023 | B2 | 11/2017 | Yu |
| 10,255,445 | B1 | 4/2019 | Brinskelle |
| 10,289,857 | B1 | 5/2019 | Brinskelle |
| 10,326,735 | B2 * | 6/2019 | Jakobsson ........... H04L 63/1441 |
| 10,541,956 | B2 * | 1/2020 | Sachtjen ................ H04L 63/10 |

(Continued)

OTHER PUBLICATIONS

Check Point Software Technologies Ltd., Firewall and SmartDefense, Version NGX R62, 702048, Sep. 25, 2006.

(Continued)

*Primary Examiner* — Trang T Doan
(74) *Attorney, Agent, or Firm* — Terrile, Cannatti & Chambers; Stephen A. Terrile (57) ABSTRACT

A method, system and computer-usable medium for performing a spoofed email detection operation, comprising: maintaining a list of allowed third party domains that are authorized to send an internally-addressed email, the list of allowed third party domains comprising a plurality of domains; receiving an email from a third party sender, the email comprising an email envelope, the email envelope storing a domain of a third party sender address of the third party sender; comparing the domain of the third party sender address stored in the email envelope with the list of allowed third party domains; identifying the domain of the third party sender address stored in the email envelope as an allowed domain when the domain of the third party sender address matches a third party domain stored within the list of allowed third party domains.

19 Claims, 4 Drawing Sheets

(56) References Cited

U.S. PATENT DOCUMENTS

| | | |
|---|---|---|
| 2002/0120599 A1 | 8/2002 | Knouse et al. |
| 2003/0169724 A1 | 9/2003 | Mehta et al. |
| 2005/0027782 A1 | 2/2005 | Jalan et al. |
| 2005/0105608 A1 | 5/2005 | Coleman et al. |
| 2006/0117172 A1 | 6/2006 | Zhang et al. |
| 2007/0208813 A1 | 9/2007 | Blagsvedt et al. |
| 2007/0244974 A1* | 10/2007 | Chasin ............... G06Q 10/107 709/206 |
| 2008/0178073 A1* | 7/2008 | Gao ................... G06F 40/103 715/243 |
| 2008/0276318 A1* | 11/2008 | Leung ................. H04L 51/12 726/23 |
| 2008/0282344 A1* | 11/2008 | Shuster ............... H04L 51/12 726/21 |
| 2009/0175211 A1 | 7/2009 | Jakobsen |
| 2009/0307600 A1 | 12/2009 | Arthur et al. |
| 2011/0271349 A1* | 11/2011 | Kaplan ................ H04L 51/12 726/26 |
| 2012/0324365 A1 | 12/2012 | Momchilov et al. |
| 2013/0034097 A1 | 2/2013 | Dharmapurikar et al. |
| 2013/0085761 A1 | 4/2013 | Bringert et al. |
| 2013/0091214 A1 | 4/2013 | Kellerman et al. |
| 2013/0340029 A1 | 12/2013 | De Armas et al. |
| 2014/0082726 A1* | 3/2014 | Dreller ................ H04L 51/26 726/23 |
| 2014/0109174 A1 | 4/2014 | Barton et al. |
| 2014/0198958 A1 | 7/2014 | Nathan et al. |
| 2014/0207850 A1 | 7/2014 | Bestler et al. |
| 2014/0215571 A1* | 7/2014 | Shuster ............... H04L 63/126 726/4 |
| 2014/0280517 A1 | 9/2014 | White et al. |
| 2014/0379812 A1* | 12/2014 | Bastide, II .......... H04L 51/12 709/206 |
| 2015/0067832 A1 | 3/2015 | Sastry |
| 2015/0261969 A1 | 9/2015 | Frost |
| 2015/0264035 A1 | 9/2015 | Waterhouse et al. |
| 2015/0264049 A1* | 9/2015 | Achilles ............. H04L 67/306 726/7 |
| 2015/0288714 A1* | 10/2015 | Emigh ................. H04N 19/895 726/22 |
| 2016/0148019 A1 | 5/2016 | Rambler et al. |
| 2016/0315969 A1* | 10/2016 | Goldstein ........... H04L 63/1483 |
| 2016/0352719 A1 | 12/2016 | Yu |
| 2017/0034100 A1* | 2/2017 | Zink ................... H04L 51/30 |
| 2017/0126587 A1 | 5/2017 | Ranns et al. |
| 2017/0134506 A1 | 5/2017 | Rotem et al. |
| 2017/0302822 A1 | 10/2017 | Vandeweerd et al. |
| 2017/0329966 A1 | 11/2017 | Koganti et al. |
| 2018/0012144 A1 | 1/2018 | Ding et al. |
| 2018/0152471 A1* | 5/2018 | Jakobsson ............. G06Q 50/01 |
| 2018/0234368 A1* | 8/2018 | Everton ................ H04L 51/12 |
| 2019/0034625 A1 | 1/2019 | Ford et al. |
| 2019/0037029 A1 | 1/2019 | Border |
| 2019/0057200 A1 | 2/2019 | Sabag et al. |
| 2019/0075124 A1 | 3/2019 | Kimhi et al. |
| 2019/0104155 A1* | 4/2019 | DiCorpo ............. H04L 63/0236 |
| 2019/0124117 A1 | 4/2019 | Swafford |
| 2019/0124118 A1 | 4/2019 | Swafford |
| 2019/0199745 A1* | 6/2019 | Jakobsson ........... H04L 63/1433 |
| 2019/0354709 A1 | 11/2019 | Brinskelle |
| 2020/0134192 A1 | 4/2020 | Gupta et al. |
| 2020/0234243 A1 | 7/2020 | Miron et al. |
| 2020/0242260 A1 | 7/2020 | Chen et al. |
| 2020/0257821 A1 | 8/2020 | Lai |
| 2020/0257822 A1 | 8/2020 | Ford et al. |
| 2020/0257823 A1 | 8/2020 | Ford et al. |

OTHER PUBLICATIONS

Check Point Software Technologies Ltd., Softwareblades, Firewall R75.40, Administration Guide, Nov. 30, 2014.
Fortinet, FortiOS Handbook—Firewall, version 5.2.0, May 5, 2017.
Wikipedia, IP Address Spoofing, printed Aug. 16, 2017.
David Davis, TechRepublic, Prevent IP Spoofing with the Cisco IOS, Mar. 14, 2007.
evostream.com, Media Serverand Video Streaming Software, https://evostream.com/#, printed Feb. 22, 2018.
wowza.com, Wowza Streaming Engine, https://www.wowza.com/products/streaming-engine, printed Feb. 22, 2018.
opencv.org, https://opencv.org/, printed Mar. 6, 2018.
stackoverflow.com, OpenCV Crop Live Feed from Camera, https://stackoverflow.com/questions/17352420/opencv-crop-live-feed-from-camera, printed Feb. 22, 2018.
Papadopoulos et al., An error control scheme for large-scale multicast applications, Proceedings, IEEE Infocom '98, the Conference on Computer Communications; Mar. 29-Apr. 2, 1998.
Schmidt et al., AuthoCast: a protocol for mobile multicast sender authentication, Proceeding, MoMM '08 Proceedings of the 6th International Conference on Advanced in Mobile Computing and Multimedia, pp. 142-149, 2008.
mybluelinux.com, What is email envelope and email header, downloaded Jan. 16, 2020.
SANS ISC InfoSec Forums, Tool to Detect Active Phishing Attacks Using Unicode Look-Alike Domains, downloaded Nov. 1, 2018, https://isc.sans.edu/forums/diary/Tool+to+Detect+Active+Phishing+Attacks+Using+Unicode+LookAlike+Domains/22310/.

* cited by examiner

*Figure 5*

DETECTION OF SPOOFED INTERNALLY-ADDRESSED EMAIL USING TRUSTED THIRD PARTY'S SPF RECORDS

BACKGROUND OF THE INVENTION

Field of the Invention

The present invention relates in general to the field of computers and similar technologies, and in particular to software utilized in this field. Still more particularly, it relates to a method, system and computer-usable medium for automated detection of a spoofed internally-addressed email message.

Description of the Related Art

An ongoing and common issue for email users is the receipt of messages from senders who have forged their email address in an attempt to mislead the message's recipients about their identity or the message's origin. In particular, such address spoofing is often used when generating spam and phishing emails. One known approach to this issue is to compare the sender address contained in the body of the email message to the Return-Path address, also commonly referred to as the bounce address or the envelope sender address, in the email message envelope. If the two addresses do not match, then the legitimacy of the sender may be questionable.

However, a given email message may have been legitimately sent by the sender even if the two addresses do not match. As an example, an organization may have a third party deliver certain email messages to a target group of users that are external to the organization. To further illustrate this example, the organization may decide to outsource an email campaign to an online marketing agency. In this example, the organization wants to appear as if they had generated and sent the emails.

As another example, the intended recipients of such emails may be associated with the same organization. To continue the example, the organization may have outsourced their human resources function to a third party. As before, the organization wants any email messages generated and distributed by the third party to appear as if they had been originated internally. Nonetheless, the organization also wants to ensure that the third party does not masquerade as the organization and send unauthorized email messages to other organizations or individuals.

SUMMARY OF THE INVENTION

A method, system and computer-usable medium are disclosed for automated detection of a spoofed internally-addressed email message. In certain embodiments, the invention relates to a method, system and computer-usable medium for performing a spoofed email detection operation, comprising: maintaining a list of allowed third party domains that are authorized to send an internally-addressed email, the list of allowed third party domains comprising a plurality of domains; receiving an email from a third party sender, the email comprising an email envelope, the email envelope storing a domain of a third party sender address of the third party sender; comparing the domain of the third party sender address stored in the email envelope with the list of allowed third party domains; identifying the domain of the third party sender address stored in the email envelope as an allowed domain when the domain of the third party sender address matches a third party domain stored within the list of allowed third party domains.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for automated detection of a spoofed internally-addressed email message. Certain aspects of the invention reflect an appreciation that email spoofing often involves inserting a forged sender address into the body of an email message that is different than the sender's Return-Path address of its associated email envelope. Accordingly, the email sender can masquerade as someone else. Certain aspects of the invention likewise reflect an appreciation that various well-known email standards, such as RFC-821 and RFC-822, fail to provide an approach to prevent such spoofing. As a result, verifying that a particular email was actually received from the sender address shown within the contents of the email message can often prove problematic.

Certain aspects of the invention reflect an appreciation that one known approach to such spoofing is for the sending mail domain to publish Sender Policy Framework (SPF) records. As described in the RFC-4408 email standard, SPF records define which Internet Protocol (IP) addresses are allowed to send mail purporting to be from a particular domain. Skilled practitioners of the art will be aware that it is common for receiving email servers to check the SPF record corresponding to the domain of the sender's Return-Path address and confirm that the IP address of the connecting Message Transfer Agent (MTA) is listed.

Certain aspects of the invention reflect an appreciation that SPF records are typically used to confirm the authenticity of the sender address, also known as the Return-Path address, shown in envelope of the email message. However, most email clients display the sender address contained in the message content, which may be different than the address shown in the envelope, when displaying the email message to its recipient. More particularly, RFC-4408 is intended to apply only to the sender's address in an email's envelope, not the sender address shown in the message's body.

Certain aspects of the invention likewise reflect an appreciation that the Domain-based Message Authentication Reporting and Conformance (DMARC) specification, described in RFC-7489, address this issue by checking the sender address in the message content against SPF records to insure its validity. More particularly, the DMARC specification is often used to overcome certain approaches commonly used in phishing attempts and email spam, such as emails with forged sender addresses that appear to originate from legitimate organizations. Likewise, certain aspects of the invention reflect a further appreciation that the DMARC specification counters illegitimate usage of the exact domain name in the "From:" field of email message headers.

Certain aspects of the invention reflect an appreciation that DMARC is built on top of SPF and DomainKeys Identified Mail (DKIM), defined in RFC-6376. Those of skill in the art will be familiar with DKIM, which allows a domain to authenticate itself as a legitimate sender by affixing a digital signature to an email message. Verification of the sender's identity is then accomplished by using the signer's public key, which is published in their DNS server. It will be appreciated that such a valid signature guarantees that some parts of the email, possibly including attachments, have not been modified since the signature was affixed. In practice, DKIM signatures are typically not visible to end-users. Instead, they are affixed or verified by the email infrastructure in which they are implemented rather than message's authors and recipients.

Certain aspects of the invention likewise reflect an appreciation that neither the aforementioned email standards, nor other known anti-spoofing approaches, provide an organization the ability to authorize a third party to send an email on their behalf, but only when sending messages to the organization's internal domains. It will likewise be appreciated that when third parties send such emails, they typically use an envelope sender address matching one of their own domains, but a message content sender address matching the recipient organization's domain. Without any additional information, such messages would normally be considered to be a spoofed and would be rejected by various security scanning services. Consequently, the authorizing organization would typically include the IP address ranges for the third party into its own SPF records.

However, two issues result from taking such an approach. First, SPF imposes certain limits on the size and complexity of SPF records. Accordingly, if the authorizing organization already has large SPF records for its own domains, adding additional information corresponding to third parties may cause it to exceed those limits, which in turn could cause SPF look-up failures at the receiving end.

Secondly, the intent of the authorizing organization is to only authorize the third party to masquerade as the organization when it is sending email to the company's own internal domains. However, it would typically not be authorizing the third party to masquerade as the organization when sending email to other organizations or individuals. Consequently, adding the third party's IP addresses into the organization's SPF records would be allowing everyone on the Internet to infer that the third party is allowed to send on its behalf, in all circumstances.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, as well as various input and output (I/O) devices, such as a keyboard, a mouse, and a graphics display.

Figure 1:
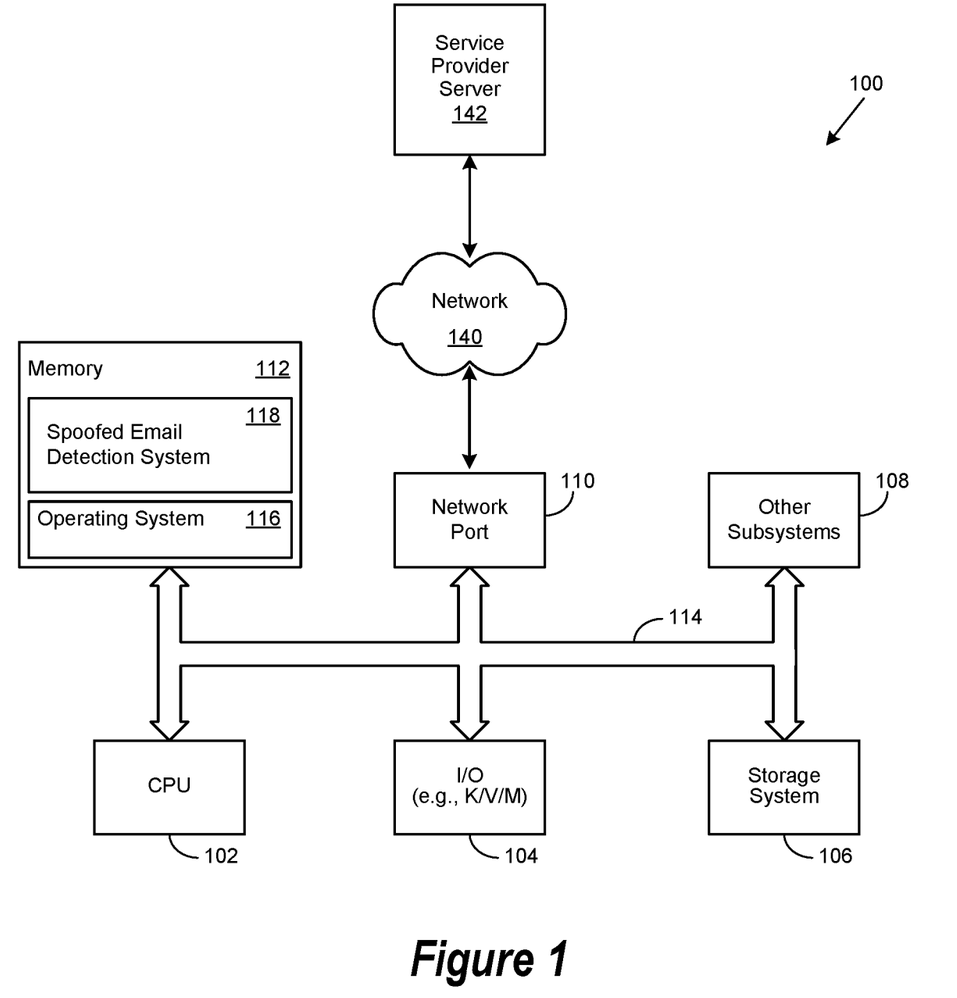
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a spoofed email detection system 118. In one embodiment, the information handling system 100 is able to download the spoofed email detection system 118 from the service provider server 142. In another embodiment, the spoofed email detection system 118 is provided as a service from the service provider server 142.

In various embodiments, the spoofed email detection system 118 performs a spoofed email detection operation. In certain embodiments, the spoofed email detection operation improves processor efficiency, and thus the efficiency of the information handling system 100, by detecting spoofed email. As will be appreciated, once the information handling system 100 is configured to perform the spoofed email detection operation, the information handling system 100 becomes a specialized computing device specifically configured to perform the spoofed email detection operation and is not a general purpose computing device. Moreover, the implementation of the spoofed email detection system 118 on the information handling system 100 improves the functionality of the information handling system 100 and provides a useful and concrete result of detecting spoofed email.

Figure 2:
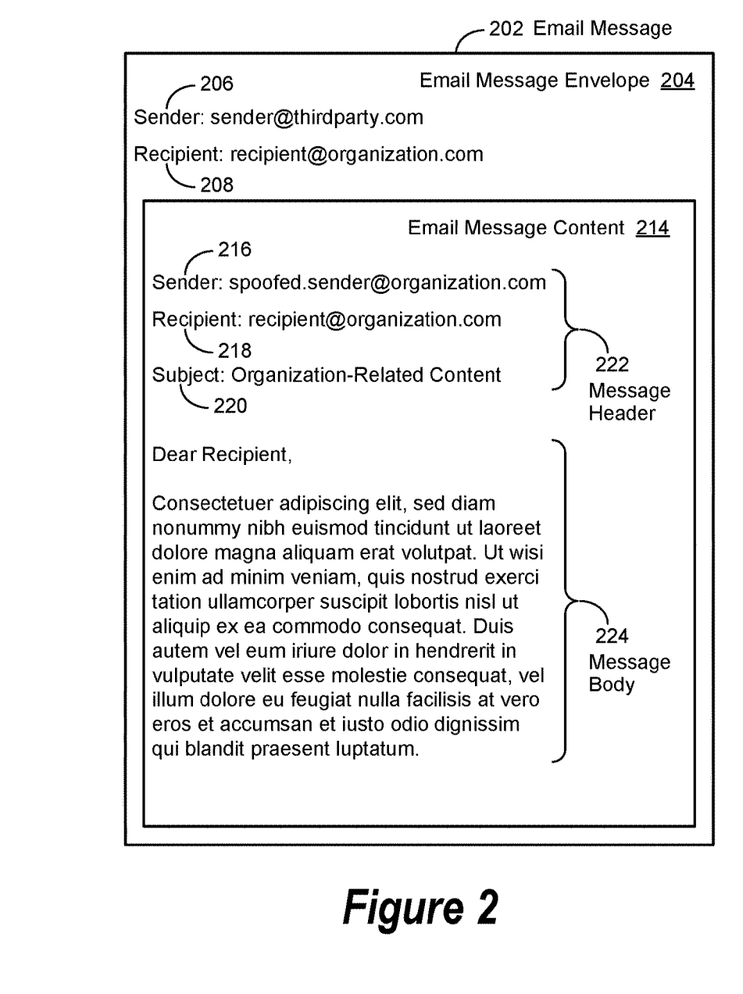
FIG. 2 is a simplified block diagram of an email message with a spoofed sender address within its message content.

FIG. 2 is a simplified block diagram of an email message implemented in accordance with an embodiment of the invention with a spoofed sender address within its message content. In this embodiment, a third party sends an email message 202 on behalf of an organization. In certain embodiments, the third party may be authorized by the organization to send the email message 202 to a particular recipient associated with the organization. In certain embodiments, the third party may be further authorized by the organization to make it appear that the organization itself has sent the email message 202. In certain embodiments, the third party may be authorized by the organization to send the email message 202 to recipients associated with the organization, but not to recipients associated with other organizations.

As shown in FIG. 2, the email message 202 includes an email message envelope 204, which in turn includes email message content 214. Skilled practitioners of the art will be familiar with email message envelopes 204, which contain certain information used by mail transport software to route an email message 202 through a network for delivery to an intended email message recipient. As likewise shown in FIG. 2, the email message content 214 includes an email message header 222 and an email message body 224. As used herein, email message content 214 broadly refers to the payload, or contents, of an email message 202. In general, the email message content 214 is the portion of an email message that is typically provided to the recipient of the email message 202. More particularly, email message envelopes 204 are typically not provided to the recipient of the email message 202, as they are usually discarded by a receiving email server once the email message 202 has been received.

Those of skill in the art will likewise be aware the sender 206 and recipient 208 addresses contained within the email message envelope 204 may be different than the sender 206 and recipient 208 addresses contained within the email message header 222. In certain embodiments, the sender address 206 contained in the email message envelope 204 may contain a domain (e.g., "thirdparty.com") associated with the third party. As used herein, a domain broadly refers to a domain name, which in turn broadly refers to an identification string defining a realm of autonomy, authority or control within the Internet. Skilled practitioners of the art will be aware that domain names are structured and formed according to the rules and procedures of the Domain Name Service (DNS). Accordingly, a name registered within the DNS is considered a domain name. Those of skill in the art will likewise be aware that domain names are used in a variety of network contexts for addressing purposes.

As an example, the recipient address 208 contained in the email message envelope 204 may contain a domain (e.g., "organization.com") associated with the organization. In certain embodiments, the sender address 216 and the recipient address 218 contained in the email message header 222 may likewise contain a domain (e.g., "organization.com") associated with the organization. In certain embodiments, the email message header 222 may contain a subject line 220, such as "Organization-Related Content." Skilled practitioners of the art will be aware that one known indicator of a spoofed email message 202 is a sender address 216 in the email message header 222 that does not match the sender address 206 in its associated email message envelope 204. However, those of skill in the art will likewise be aware that sending such a spoofed email message 202 to a particular recipient may be authorized by the email message recipient's associated organization.

Figure 3:
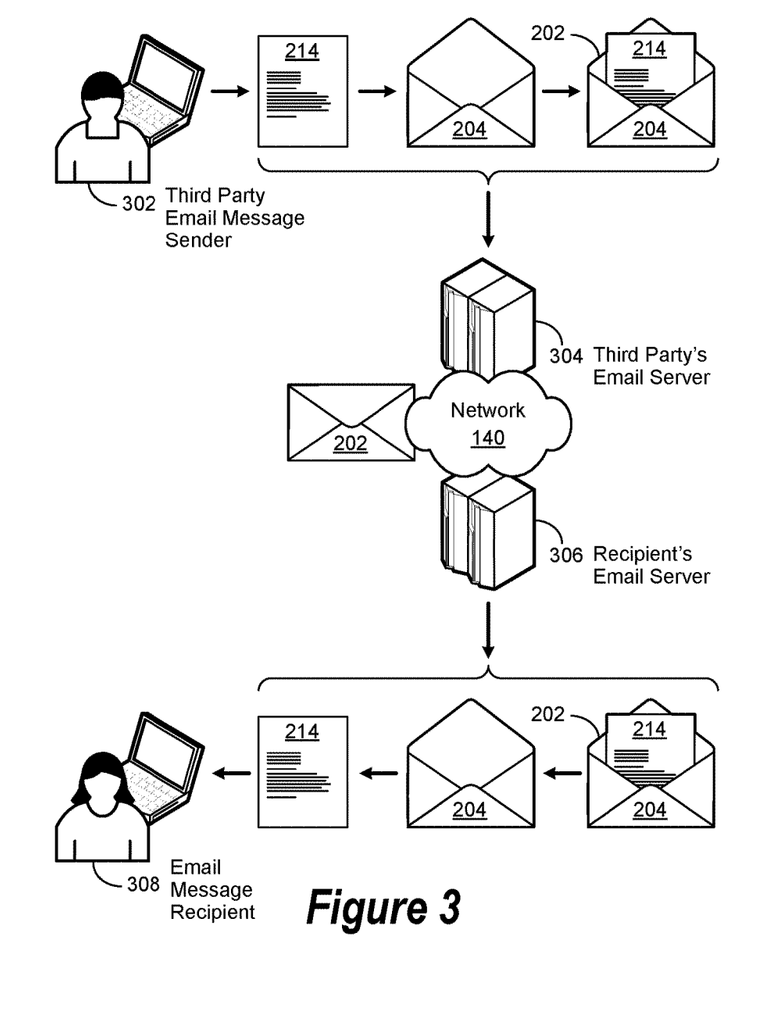
FIG. 3 is a simplified block diagram of the delivery of an email message with a spoofed sender address within its message content to a recipient.

FIG. 3 is a simplified block diagram of the delivery of an email message implemented in accordance with an embodiment of the invention with a spoofed sender address within its message content to a recipient. In this embodiment, a third party email message sender 302 may be authorized by an organization to deliver an email message 202 to a particular email message recipient 308 associated with the organization. In certain embodiments, the third party email message sender 302 may combine certain email message content 214 with an email message envelope 204 to generate an email message 202. In these embodiments, the email message content 214 may be generated by the third party email message sender 302, the organization, or a combination thereof.

In certain embodiments, the sender address contained in the email message envelope 204 may contain a domain (e.g., "thirdparty.com") associated with the third party email message sender 302. Likewise, the recipient address contained in the email message envelope 204 may contain a domain (e.g., "organization.com") associated with the organization. In certain embodiments, the sender address 216 and the recipient address 218 included in the email message content 214 may likewise contain a domain (e.g., "organization.com") associated with the organization.

In certain embodiments, the resulting email message 202 may be sent by the third party's email server 304, via a network 140 (e.g., the Internet) to the recipient's email server 306. Once it is received by the recipient's email server 306, the email message 202 is processed to separate the email message's content 214 from its associated email message envelope 204. In certain embodiment, the email message envelope 204 may be discarded. The resulting email message content 214 is then delivered to the recipient address of the email message recipient 308 contained in the email message content 214.

Figure 4:
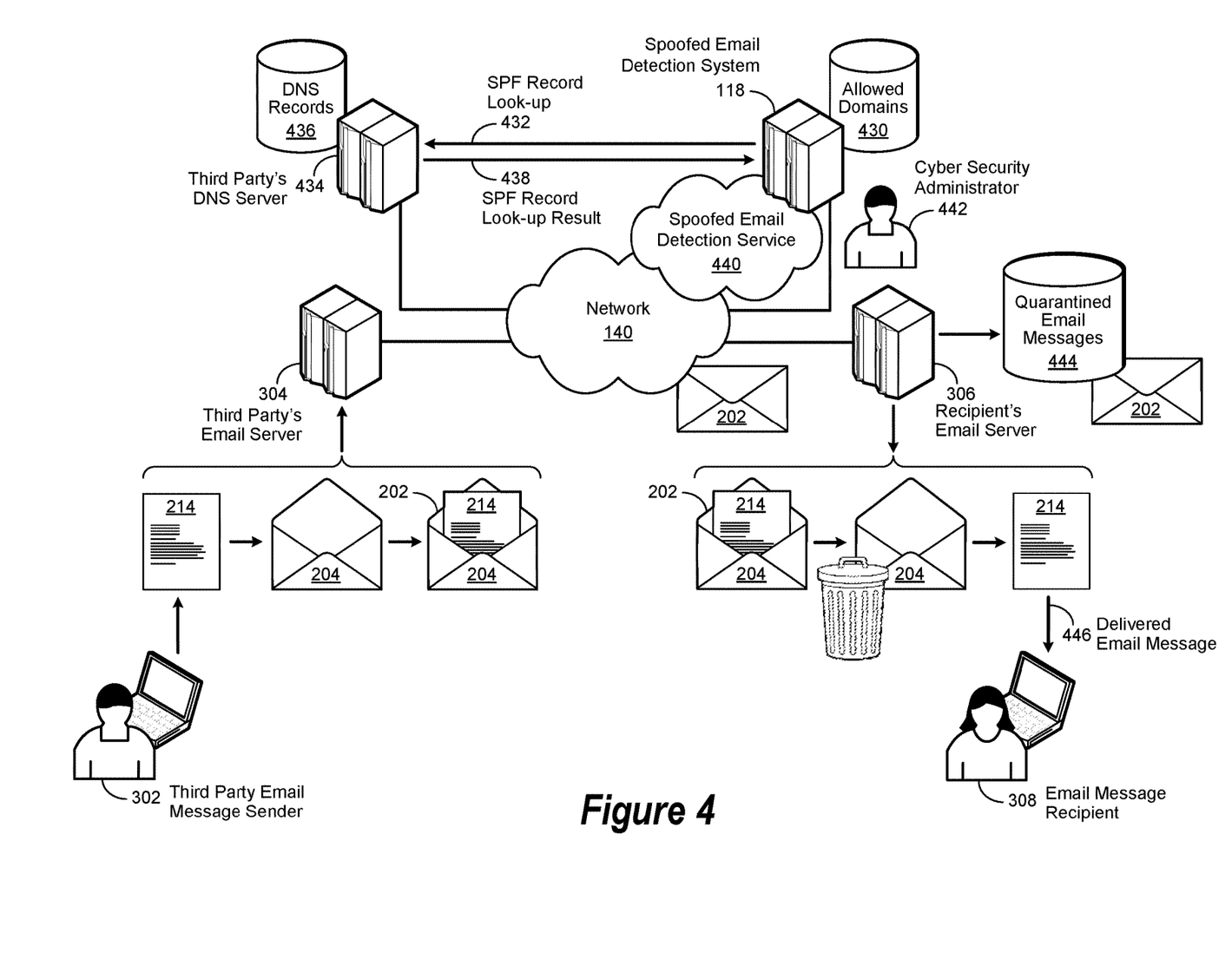
FIG. 4 is a simplified block diagram of a spoofed email detection system implemented to detect spoofed internally-addressed email messages.

FIG. 4 is a simplified block diagram of a spoofed email detection system implemented in accordance with an embodiment of the invention. In certain embodiments, a spoofed email detection system 118, described in greater detail herein, may be implemented to detect spoofed internally-addressed email messages. In certain embodiments, the functionality of the spoofed email detection system 118 may be provided as a spoofed email detection service 440.

In certain embodiments, a third party email message sender 302 may be authorized by an organization to deliver an email message 202 to a particular email message recipient 308 associated with the organization. In certain embodiments, the third party email message sender 302 may combine certain email message content 214 with an email message envelope 204 to generate an email message 202. In these embodiments, the email message content 214 may be generated by the third party email message sender 302, the organization, or a combination thereof.

In certain embodiments, the sender address contained in the email message envelope 204 may contain a domain (e.g., "thirdparty.com") associated with the third party email message sender 302. Likewise, the recipient address contained in the email message envelope 204 may contain a domain (e.g., "organization.com") associated with the organization. In certain embodiments, the sender and recipient addresses included in the email message content 214 may likewise contain a domain (e.g., "organization.com") associated with the organization. In certain embodiments, the resulting email message 202 may be sent by the third party's email server 304, via a network 140 (e.g., the Internet) to the recipient's email server 306.

Once the email message 202 is received by the recipient's email server 306, the message header of the received email message is processed to identify the domains of the sender and recipient addresses it contains. A determination is then made whether the identified sender and recipient domains are valid domains associated with the organization. In certain embodiments, operations to determine whether the identified sender and recipient domains are valid domains associated with the organization may be performed by the recipient's email server 306, the spoofed email detection system 118, the spoofed email detection service 440, or a combination thereof.

If it is determined the sender and recipient domains contained in the email message header are not valid domains associated with the organization, then the email message 202 identified as an unauthorized email message. In certain embodiments, the unauthorized email message is quarantined in a repository of quarantined email messages 444. In certain embodiments, the quarantining of the email message 202 may be performed automatically by the recipient's email server 306, the spoofed email detection system 118, or the spoofed email detection service 440. In certain embodiments, the quarantining of the email message 202 may be manually performed by a cyber security administrator 442. In certain embodiments, the quarantining of the email message 202 may be semi-automated by the recipient's email server 306, the spoofed email detection system 118, the spoofed email detection service 440, or a combination thereof.

However, if it is determined the sender and recipient domains contained in the email message header are valid domains associated with the organization, then the email message envelope 204 is processed to identify the domain of the sender address it contains. A determination is then made whether the organization allows email messages 202 from the sender's domain to be delivered to its associated email message recipients 308. In certain embodiments, a list of allowed email message 202 sender domains may be stored in a repository of allowed domains 430. Certain embodiments of the invention reflect an appreciation that the implementation of such a list of allowed email message 202 sender domains requires no modification to the organizations Sender Policy Framework (SPF) records, described in greater detail herein.

In certain embodiments, the determination of whether email messages 202 from the sender's domain is allowed to be delivered to its associated email message recipients 308 is further restricted to a specific email message 202 sender associated with the sender's domain. As an example, first.sender@thirdparty.com may be allowed to deliver an email message 202 while second.sender@thirdparty.com may not. In certain embodiments, a list of specific email message 202 senders, and their respective domains, may be stored in the repository of allowed domains 430.

In certain embodiments, the determination of whether a particular email message 202 sender domain, or an associated email message 202 sender, is allowed may be performed automatically by the recipient's email server 306, the spoofed email detection system 118, or the spoofed email detection service 440. In certain embodiments, the determination of whether a particular email message 202 sender domain is allowed may be manually performed by a cyber security administrator 442. In certain embodiments, the determination of whether a particular email message sender 202 domain is allowed may be semi-automated by the recipient's email server 306, the spoofed email detection system 118, the spoofed email detection service 440, or a combination thereof. In these embodiments, the method by which individual sender domains are determined to be allowed, stored in the repository of allowed domains 430, managed as a list, or a combination thereof, is a matter of design choice.

If it is determined that the email message's 202 sender domain is not allowed by the organization, then the email message 202 is quarantined, as before. Otherwise, a determination is made whether the third party email message sender 302 is authorized to send email messages 202 originating from an associated third party email server 304. In certain embodiments, this determination may be accomplished by performing an SPF record look-up operation 432.

Skilled practitioners of the art will be familiar with SPF, which is an email validation system designed to detect spoofing of email messages 202. Known implementations of SPF provide an approach that allows receiving email message exchangers to determine whether incoming mail from a particular email message 202 sender domain is received from a host authorized by that domain's administrators. In certain embodiments, the receiving email message exchanger may be implemented as the recipient's email server 306.

In certain embodiments, the email message 202 sender's domain may be associated with the third party's Domain Name System (DNS) server 434, which in turn may be associated with the third party's email server 304. Those of skill in the art will likewise be aware that in typical SPF implementations, the list of authorized sending hosts for a particular domain is published in the DNS records 436 for that domain in the form of a specially formatted text (TXT) record. In certain embodiments, the SPF TXT record may be stored in a repository of DNS records 436 associated with the third party's DNS server 434. In certain embodiments, the authorized sending host for a particular domain may be the third party's email server 304.

In certain embodiments, the spoofed email detection system 118, or the spoofed email detection service 440, may be implemented to perform the SPF record look-up 432 operation. In certain embodiments, the SPF record look-up 432 operation is performed to confirm the email server corresponding to the sender's address contained in the email message's envelope 204 is authorized to send email messages 202 on behalf of the third party email message sender's 302 associated domain. In certain embodiments, the confirmation is returned in the form of an SPF record look-up result 438 to the spoofed email detection system 118 or the spoofed email detection service 440

If the results of the SPF record look-up 432 operation indicate the email server corresponding to the sender's address contained in the email message's envelope 204 is not authorized to send email messages on behalf of the third party email message sender's 302 associated domain, then the email message 202 is quarantined, as before. Otherwise, the email message 202 is processed to separate the email message's content 214 from its associated email message envelope 204. In certain embodiments, the email message envelope 204 may be discarded. The recipient address contained in the resulting email message content 214 is then used to deliver 446 the email message content 214 to the email message recipient 308. The method by which the resulting email message content 214 is delivered 446 to the email message recipient 308 is a matter of design choice.

From the foregoing, skilled practitioners of the art will recognize that certain embodiments of the invention allow an organization to authorize a third-party service provider (e.g., salesforce automation, human resources, insurance benefits, payroll and expense report processing, etc.) to send email messages 202 to certain email message recipients 308 on the organization's behalf. Those of skill in the art will likewise recognize that certain embodiments of the invention allow such email messages 202 to be sent without being blocked by typical anti-spoofing approaches. It will likewise be appreciated that certain embodiments of the invention may allow an organization to authorize a third party email message sender 302 to send email messages 202 to internal email message recipients 308 on their behalf. Likewise, it will be appreciated that certain embodiments of the invention may prevent the same third party email message sender 302 posing as the organization when attempting to send email messages 202 to email message recipients 308 that are not associated with the organization.

Figure 5:
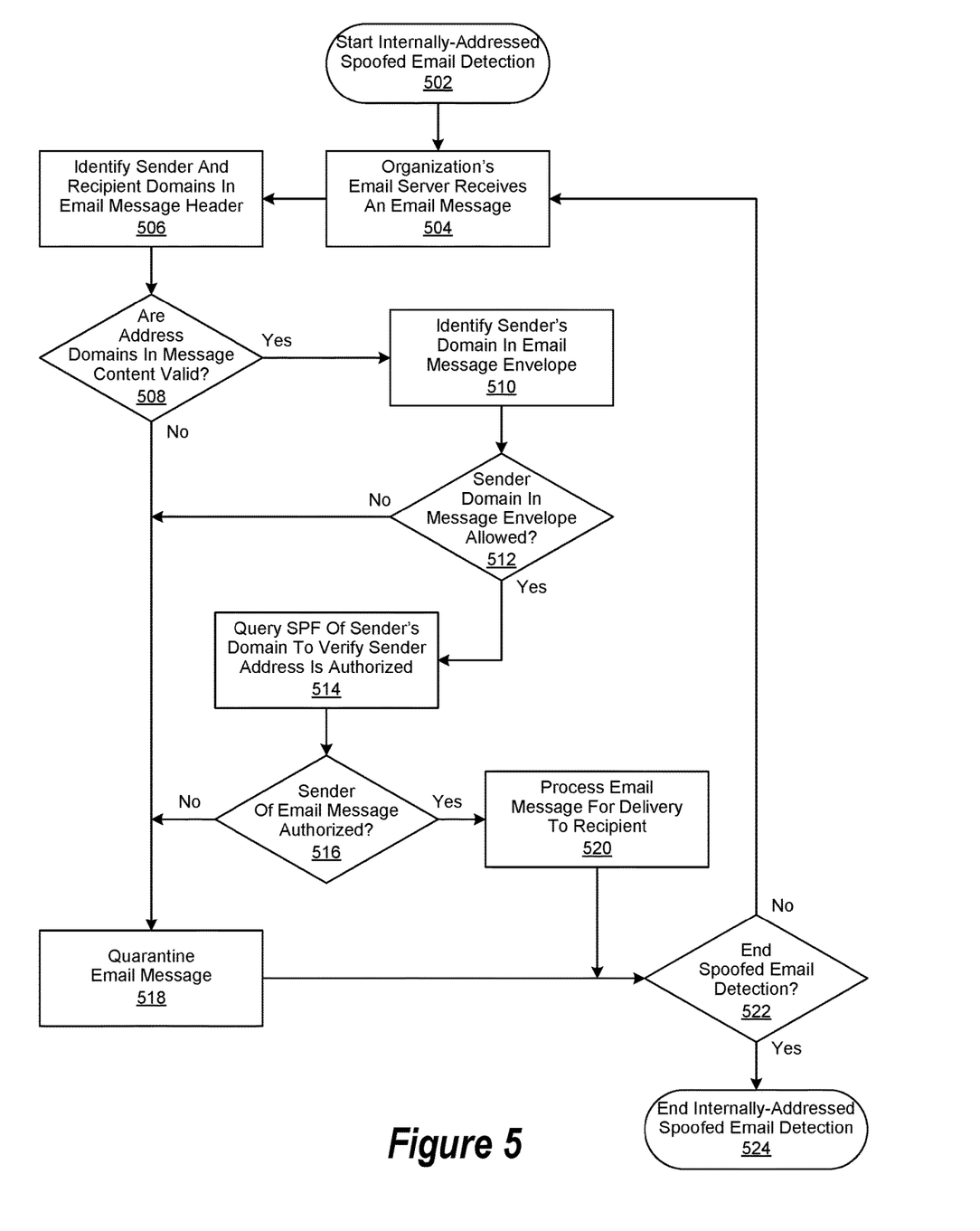
FIG. 5 is a generalized flowchart of the performance of operations to detect spoofed internally-addressed email messages.

FIG. 5 is a generalized flowchart of the performance of operations implemented in accordance with an embodiment of the invention to detect spoofed internally-addressed email messages. In this embodiment, spoofed internally-addressed email detection operations are begun in step 502, followed by the receipt of an email message by an organization's email mail server in step 504. The message header of the received email message is then processed in step 506 to identify the domains of the sender and recipient addresses it contains.

A determination is then made in step 508 whether the address domains contained in the email message header are valid domains associated with the organization. If not, then the email message is quarantined in step 518. Otherwise, the envelope of the email message is processed in step 510 to identify the domain of the sender address it contains.

A determination is then made in step 512 whether the organization allows email messages from the sender's domain to be delivered to its associated recipients. If not, then the email message is quarantined in step 518. Otherwise, the Sender Policy Framework (SPF) record associated with the domain corresponding to the sender's address contained in the email message's envelope is queried in step 514 to confirm the email server used to send the email message is authorized to send email messages on behalf of the domain. A determination is then made in step 516 to determine whether the email server used to send the email message was authorized to send on behalf of the domain. If not, then the email message is quarantined in step 518.

Otherwise, the email message is processed in step 520 for delivery to its intended recipient. Thereafter, or if the email message was quarantined in step 518, a determination is made in step 522 whether to end spoofed internally-addressed email detection operations. If not, then the process is continued, proceeding with step 504. Otherwise, spoofed internally-addressed email detection operations are ended in step 524.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a spoofed email detection operation, comprising:

maintaining a list of allowed third party domains that are authorized to send an internally-addressed email, the list of allowed third party domains comprising a plurality of domains;

receiving an email from a third party sender, the email comprising an email envelope and email message content, the email envelope storing a domain of a third party sender address of the third party sender, the email message content comprising an email header, the email header comprising a sender address, the third party sender address being different from the sender address;

comparing the domain of the third party sender address stored in the email envelope with the list of allowed third party domains;

identifying the domain of the third party sender address stored in the email envelope as an allowed domain when the domain of the third party sender address matches a third party domain stored within the list of allowed third party domains; and, querying a Sender Policy Framework (SPF) of the domain of the third party sender address to verify whether an email server is authorized, the querying the SPF of the domain performing an SPF record look-up operation, the SPF record look-up operation confirming the email server is authorized to send email messages, the SPF record look-up operation allowing an organization to authorize a third-party service provider to send email messages to certain email message recipients on behalf of the organization.

2. The method of claim 1, further comprising:
determining whether the email server used to send the third party email is authorized to send on behalf of the domain corresponding to the third party sender address stored in the email envelope.

3. The method of claim 2, wherein:
confirmation that the email service is authorized to send email messages is provided via an SPF record look-up result from a third party Domain Name System (DNS) server to a recipient email server.

4. The method of claim 2, further comprising:
identifying the email message as unauthorized when the email server used to send the third party email is not authorized to send on behalf of the domain corresponding to the third party sender address stored in the email envelope.

5. The method of claim 1, wherein:
the email message content comprises a message body.

6. The method of claim 1, further comprising:
extending the list of allowed domains to include specific senders and respective domains of the specific senders.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:

maintaining a list of allowed third party domains that are authorized to send an internally-addressed email, the list of allowed third party domains comprising a plurality of domains;

receiving an email from a third party sender, the email comprising an email envelope and email message content, the email envelope storing a domain of a third party sender address of the third party sender, the email message content comprising an email header, the email header comprising a sender address, the third party sender address being different from the sender address;

comparing the domain of the third party sender address stored in the email envelope with the list of allowed third party domains;

identifying the domain of the third party sender address stored in the email envelope as an allowed domain when the domain of the third party sender address matches a third party domain stored within the list of allowed third party domains; and, querying a Sender Policy Framework (SPF) of the domain of the third party sender address to verify whether an email server is authorized, the querying the SPF of the domain performing an SPF record look-up operation, the SPF record look-up operation confirming the email server is authorized to send email messages, the SPF record look-up operation allowing an organization to authorize a third-party service provider to send email messages to certain email message recipients on behalf of the organization.

8. The system of claim 7, wherein the instructions executable by the processor are further configured for:
determining whether the email server used to send the third party email is authorized to send on behalf of the domain corresponding to the third party sender address stored in the email envelope.

9. The system of claim 8, wherein:
confirmation that the email service is authorized to send email messages is provided via an SPF record look-up result from a third party Domain Name System (DNS) server to a recipient email server.

10. The system of claim 8, wherein the instructions executable by the processor are further configured for:
identifying the email message as unauthorized when the email server used to send the third party email is not authorized to send on behalf of the domain corresponding to the third party sender address stored in the email envelope.

11. The system of claim 7, wherein:
the email message content comprises a message body.

12. The system of claim 7, wherein the instructions executable by the processor are further configured for:
extending the list of allowed domains to include specific senders and respective domains of the specific senders.

13. A non-transitory, computer-readable storage medium embodying computer program code, the computer program code comprising computer executable instructions configured for:

maintaining a list of allowed third party domains that are authorized to send an internally-addressed email, the list of allowed third party domains comprising a plurality of domains;

receiving an email from a third party sender, the email comprising an email envelope and email message content, the email envelope storing a domain of a third party sender address of the third party sender, the email message content comprising an email header, the email header comprising a sender address, the third party sender address being different from the sender address;

comparing the domain of the third party sender address stored in the email envelope with the list of allowed third party domains;

identifying the domain of the third party sender address stored in the email envelope as an allowed domain when the domain of the third party sender address matches a third party domain stored within the list of allowed third party domains; and, querying a Sender Policy Framework (SPF) of the domain of the third party sender address to verify whether an email server is authorized, the querying the SPF of the domain performing an SPF record look-up operation, the SPF record look-up operation confirming the email server is authorized to send email messages, the SPF record look-up operation allowing an organization to authorize a third-party service provider to send email messages to certain email message recipients on behalf of the organization.

14. The non-transitory, computer-readable storage medium of claim 13, wherein the computer executable instructions are further configured for:
   determining whether the email server used to send the third party email is authorized to send on behalf of the domain corresponding to the third party sender address stored in the email envelope.

15. The non-transitory, computer-readable storage medium of claim 14, wherein:
   confirmation that the email service is authorized to send email messages is provided via an SPF record look-up result from a third party Domain Name System (DNS) server to a recipient email server.

16. The non-transitory, computer-readable storage medium of claim 14, wherein the computer executable instructions are further configured for:
   identifying the email message as unauthorized when the email server used to send the third party email is not authorized to send on behalf of the domain corresponding to the third party sender address stored in the email envelope.

17. The non-transitory, computer-readable storage medium of claim 13, wherein:
   the email message content comprises a message body.

18. The non-transitory, computer-readable storage medium of claim 13, wherein the computer executable instructions are further configured for:
   extending the list of allowed domains to include specific senders and respective domains of the specific senders.

19. The non-transitory, computer-readable storage medium of claim 13, wherein:
   the computer executable instructions are deployable to a client system from a server system at a remote location.

* * * * *